Oct. 25, 1960 N. E. HOGUE 2,958,017
FAST ATTACK SLOW RELEASE RELAY CIRCUIT
Filed Oct. 22, 1958
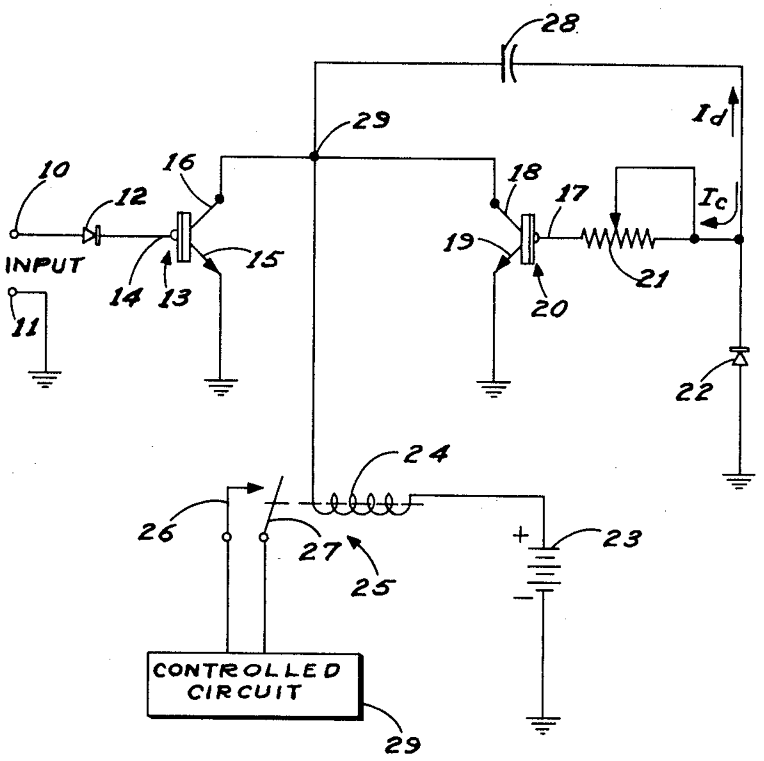
INVENTOR.
NOEL E. HOGUE
BY Morris Moody
ATTORNEY United States Patent Office 2,958,017
Patented Oct. 25, 1960

2,958,017

FAST ATTACK SLOW RELEASE RELAY CIRCUIT

Noel E. Hogue, Cedar Rapids, Iowa, assignor to Collins Radio Company, Cedar Rapids, Iowa, a corporation of Iowa Filed Oct. 22, 1958, Ser. No. 768,890

5 Claims. (Cl. 317—148.5)

This invention relates generally to switching circuits, and more particularly to a fast attack slow release transistorized switching circuit.

Devices performing the same function as this invention have generally incorporated relays in conjunction with thermally-controlled holding contacts, or electron discharge devices that incorporate large capacitors in order to obtain the required resistance capacitance (RC) time delay. These circuits, however, have certain deflects. The operating time of the thermal-controlled relays is very dependent upon the ambient temperature of the thermal unit and upon the control of the heating current. The electron discharge circuits require extremely large capacitors and resistors to obtain a long time delay and, as a consequence, limit the available space. This invention, however, uses small components and the time delay circuit components that obtain the slow release feature are small and not unduly subject to normal ambient temperature variations.

The relay of this invention can be energized by a pulse as narrow as a few milliseconds and will remain energized upon removal of the pulse for several seconds, thus providing a circuit with an extremely rapid attack time and long release time. A representative circuit constructed according to the teachings of this invention operates with a five millisecond pulse and maintains a drop-out time of five seconds.

Therefore, it is an object of this invention to provide a relay circuit with a fast attack and a slow release.

It is another object of this invention to provide a circuit with a controllable release time.

It is still another object of this invention to provide a circuit where the release time is wholly independent of the attack time.

It is a still further object of this invention to provide a relay circuit that is stable within normal temperature variations.

This invention features first and second transistors with their collectors and emitters connected in parallel. An input is connected to the base of the first transistor. The base of the second transistor is serially connected through an adjustable resistor and diode to ground. A relay energizing coil is connected between the common junction of the collectors and a power source. The capacitor that governs the release time is connected between the common junction of the collectors and the junction of the adjustable resistor and diode. When a voltage of sufficient magnitude is applied to the base of the first transistor, it will be driven to saturation and the collector-to-emitter resistance will drop to a very low value. This will provide a low resistance path between the voltage source and ground causing the relay to operate. The time-delay capacitor will also be simultaneously discharged through the first transistor and diode. Upon removal of the signal to the input of the circuit, the first transistor will return to a normally non-conductive state. However, since the diode is non-conductive to the recharge current, the time-delay capacitor must recharge through a path that includes the resistance of the second transistor from its base to emitter, the resistance of the relay coil, and the resistance of the adjustable resistor. Thus during the recharge cycle of the time-delay capacitor, the relay will remain energized since the collector current of the second transistor will maintain a current through the relay coil.

Another feature of this invention is the placement of the time-delay capacitor between the base and collector of the second transistor which provides an effective time constant that is computed not only by the product of the physical sizes of the various circuit components, but also by the current gain of the second transistor.

These and other features and objects of the invention will become apparent from the following description and claims when read in view of the accompanying drawing which shows a preferred embodiment of this invention.

A pair of input terminals 10 and 11 are connected to the anode of an isolation diode 12 and to ground respectively. The cathode of isolation diode 12 is connected to the base 14 of a transistor 13. The emitter 15 of transistor 13 is connected to ground. Collector 16 of transistor 13 is connected to collector 18 of a second transistor 20. An emitter 19 of transistor 20 is also connected to ground. Base 17 of transistor 20 is serially connected to ground through an adjustable resistor 21 and a diode 22. The parallelly connected collectors 16 and 18 of transistors 13 and 20 are connected to a positive source of voltage 23 through an energizing coil 24 of a relay 25. A time-delay capacitor 28 has one end connected to the parallelly connected collectors 16, 18 and its opposite end connected to the junction between the adjustable resistor 21 and diode 22. A pair of contacts 26 and 27 of relay 25 are connected to an external circuit 29 that is to be controlled.

In operation, a signal is applied to the base 14 of transistor 13 from the input circuit which includes terminals 10, 11 and isolation diode 12. The signal must be of sufficient magnitude to drive transistor 13 to saturation which will lower the emitter-to-collector resistance ($R_{ec}$) to a very low value. The decrease of $R_{ec}$ will simultaneously cause a voltage reduction at a junction 29. This will result in a current increase from the power source to ground through the energizing coil 24 of sufficient magnitude to cause relay 25 to operate. The operation of the relay will close contacts 26 and 27 and cause the controlled circuit 29 to function. The decrease in $R_{ec}$ will also simultaneously discharge the time-delay capacitor 28, causing a current $I_d$ to flow from ground, through diode 22, capacitor 28, and again to ground through transistor 13 from its collector 16 to emitter 15. Once the input signal is removed from base 14 of transistor 13, transistor 13 will return to a non-conductive state which in turn will cause $R_{ec}$ to return to its original high resistance. With $R_{ec}$ of transistor 13 now presenting a high resistance to the flow of both relay current and capacitor 28 discharge current $I_d$, the voltage at junction 29 will tend to rise. However, the rate that this voltage will rise is directly dependent upon the RC time constant presented to the circuit at this junction. The actual time constant will be the product of the RC time constant of the circuit and the current gain of the transistor (for further explanation of this effect see Transistor Electronics by DeWitt and Rossoff, pp. 250–251). The resistance presented to the circuit at junction 29 will be the preselected value of the adjustable resistor 21, the emitter-to-base resistance of transistor 20, the internal resistance of the battery and resistance of the relay coil. An increase in voltage will cause capacitor 28 to begin charging. Since diode 22 now presents a high impedance to any reverse current, the charging current, $I_c$, must pass through capacitor 28, the variable resistor 21 and the base-to-emitter circuit of transistor 20. This current will be sufficient to saturate transistor 20, thus lowering its emitter-to-collector resistance to a very low value. The relay current is now afforded a new low resistance path through transistor 20 from its collector 18 to emitter 19 which will permit relay 25 to remain energized. As capacitor 28 becomes charged the current $I_c$ flowing through the relay will eventually fall below the drop-out value of the relay, at which time the relay contacts 26 and 27 will open. The resistance of variable resistor 10 can be increased or decreased to decrease or increase respectively the discharge rate of the capacitor, thus increasing or decreasing the holding time of the relay contacts 15 and 16. Upon inspection of the input circuit, it is also evident that the attack time constant is very low since the resistance of the input transistor 13 and the isolation diode 12 is very low.

Thus a circuit is provided with a very rapid attack time and a very slow release time. The circuit has a minimum of parts and the physical size of the time delay capacitor is very small compared to the delay time of the relay circuit. Also, by the inclusion of the variable resistor 21, an independent method is provided for varying the release time of the circuit.

It is obvious to those skilled in the art that other transistors or electronic control means may be substituted for those disclosed in this embodiment by proper polarization of the diodes and proper selection of the bias voltages.

Although this invention has been described with respect to a particular embodiment thereof, it is not to be so limited as changes and modifications may be made therein which are within the full intended scope of the invention as defined by the appended claims.

I claim:

1. A fast attack slow release relay circuit comprising, an electronic coupling means including at least a control electrode, an output electrode and a common electrode, an input means, said input means connected to said control electrode, a transistor including at least an emitter, a collector and a base, said output electrode of said electronic control means connected to said collector, means connecting said common electrode of said coupling means to ground and means connecting said emitter of said transistor to ground, a source of biasing potential having a pair of terminals with one terminal thereof connected to ground, relay means connected between a second terminal of said source of biasing potential and said collector, a semiconductor, means connecting the base of said transistor to the first end of said semiconductor, the second end of said semiconductor connected to ground, a capacitor connected between said collector and the first end of said semiconductor whereby when a pulse of sufficient magnitude is applied to said input means said relay means will operate and when said pulse is removed from said input means said capacitor in cooperation with said transistor will continue to relay in an operative state for a substantial period of time.

2. A fast attack slow release relay circuit as claimed in claim 1 wherein said electronic control means includes a transistor, said transistor having at least a base, an emitter and collector, functioning respectively as said control electrode, common electrode, and output electrode.

3. A fast attack slow release relay circuit as claimed in claim 1 including a resistive means serially connected between the base of said transistor and the first end of said semiconductor.

4. A fast attack slow release relay circuit as described in claim 3 wherein said resistive means comprises a variable resistor, whereby the delay time of said relay may be substantially changed by variation of said resistor.

5. A fast attack slow release relay circuit comprising first and second transistors, each of which includes at least a base, a collector and emitter, an input means connected to the base of said first transistor, the collectors of said first and second transistors connected at a common junction, the emitters of said first and second transistors connected to ground, a source of biasing voltage having a pair of terminals with one terminal thereof connected to ground, a relay means connecting said common collector junction with the other terminal of said source of biasing voltage, a diode, a resistive means connecting the base of said second transistor with the first end of said diode, a second end of said diode connected to ground, a capacitor connected between the common junction of said collectors and the first end of said diode; whereby, when a pulse of sufficient magnitude is applied across said input, said relay means will operate and when said pulse is removed, said capacitive means in cooperation with said transistor will continue said relay in an operative state for a substantial period of time.

References Cited in the file of this patent

UNITED STATES PATENTS 2,622,195 Smith ---------------- Dec. 16, 1952

OTHER REFERENCES

Bukstein: "Radio & Television News," December 1954, page 76.

UNITED STATES PATENT OFFICE

CERTIFICATE OF CORRECTION

Patent No. 2,958,017 October 25, 1960

Noel E. Hogue

It is hereby certified that error appears in the printed specification of the above numbered patent requiring correction and that the said Letters Patent should read as corrected below.

Column 4, line 8, for "to" read -- said --.

Signed and sealed this 25th day of April 1961.

(SEAL)
Attest:

ERNEST W. SWIDER
Attesting Officer

DAVID L. LADD
Commissioner of Patents